April 22, 1941.         J. J. ETTINGER         2,239,088
FRACTURE NAIL
Filed March 30, 1940
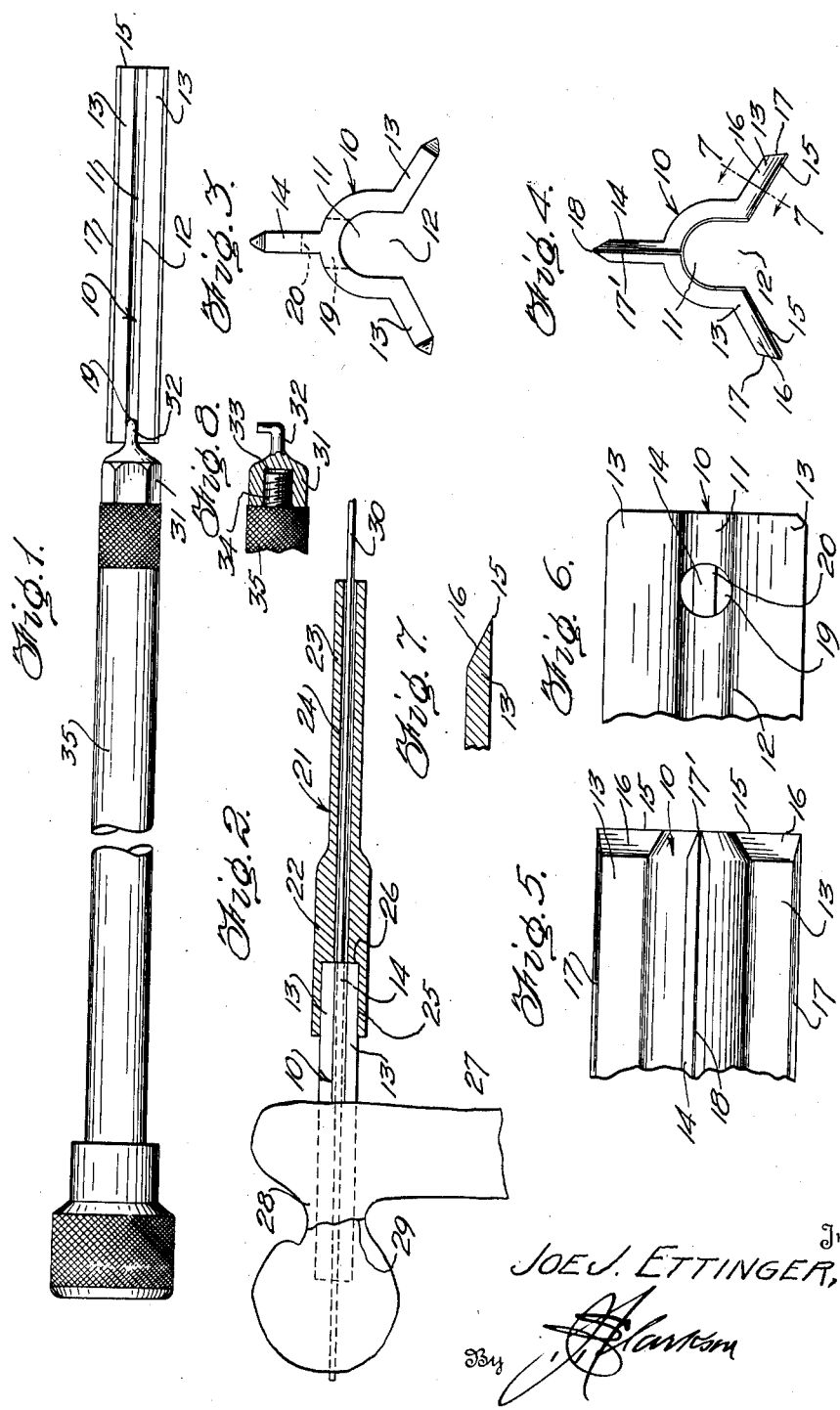
Inventor
JOE J. ETTINGER,
By
Attorney Patented Apr. 22, 1941

2,239,088

UNITED STATES PATENT OFFICE 2,239,088

FRACTURE NAIL

Joe J. Ettinger, Warsaw, Ind.

Application March 30, 1940, Serial No. 326,935

2 Claims. (Cl. 128—92)

This invention relates to fracture nails and has special reference to a fracture nail for connecting broken parts of the femur where fractured through the neck.

Fracture nails for this purpose have been used prior to the present invention and in one form of these nails the nail has been bored from end to end through its central portion so that, prior to the driving of the nail a pilot pin may be drilled through the upper end of the femur to guide the nail and prevent the latter from penetrating through the cortex of the neck. With a pilot pin thus used in connection with a nail having a drilled hole it is necessary that the nail be applied by passing the same onto the pin from the outer end thereof. Nails for this purpose having axial holes are not only expensive to manufacture but also require a heavy central portion of stem which is apt to split the neck when the nail is driven therethrough.

One important object of the present invention is to provide an improved fracture nail for connecting parts of a femur in which the neck is fractured, the nail being provided with means for holding it in contact with a pilot pin while not requiring a heavy central stem or shaft and thus decreasing the liability of splitting the femur neck.

A second important object of the invention is to provide a novel nail for this purpose wherein the head common on the driving end of such nails is eliminated.

A third important object of the invention is to provide an improved combination of such nail with novel driving means.

A fourth important object of the invention is to provide an improved construction of such a nail wherein the nail will be constantly urged into contact with a previously inserted pilot pin.

A fifth important object of the invention is to provide a novel means for extracting the nail after its use is no longer necessary.

With the above and other objects in view, the invention consists in general of certain novel details of construction and combinations of parts hereinafter fully described, illustrated in the accompanying drawing and particularly pointed out in the appended claims.

In the accompanying drawing like characters of reference indicate like parts in the several views, and:

Figure 1 is a side elevation of the nail with the extractor device applied thereto.

Figure 2 is a view partly in side elevation and partly in section and showing the nail, the driver and the pilot pin in relation to a femur having a fracture through its neck.

Figure 3 is a greatly enlarged end view of the nail taken from the rear or driven end.

Figure 4 is a greatly enlarged end view of the nail taken from the front end.

Figure 5 is a greatly enlarged side elevation of the front end portion of the nail looking downwardly with respect to Figure 4.

Figure 6 is a greatly enlarged side view of the rear end of the nail looking upwardly with respect to Figure 3.

Figure 7 is an enlarged detail section on the line 7—7 of Figure 4.

Figure 8 is a fragmentary detail showing the extractor elements.

The nail itself, as constructed in accordance with the present invention, includes a central stem portion 10 of thin metal arcuate in cross-section and, as here shown, the stem constitutes a portion of the arc of a circle having an extent of substantially 180° so as to form a channel 11 having a mouth 12. This stem extends the entire length of the nail. From the edges of the arcuate channel extend radial ribs 13 and, in the form shown, a third radial rib 14 extends from the back of the channel, the ribs thus being spaced at 120°. The forward ends of the ribs 13 are provided with chisel edges 15, the outer or remote faces of the ribs 13 being bevelled to produce the chisel as at 16. The longitudinal edges of the ribs 13 are also bevelled on their outer or remote faces as at 17. The rib 14 is provided with a chisel edge 17' at its forward end and with a longitudinal chisel edge 18, the edges 17' and 18 being formed by bevelling from both faces of the rib.

Adjacent the outer end of the nail and opposite the rib 14 there is provided a hole 19 which extends through the wall of the channel and the rib 14 is provided with a recess 20 alined with the hole 19.

The driver of this nail consists of an elongated member 21 having a relatively large forward end 22 and a relatively small rear end 23. The driver 21 has a bore 24 extending therethrough and the forward end of this bore is enlarged as at 25 to fit over the outer end of the nail, the portion 25 being provided at its inner end with a shoulder 26 to engage the outer end face of the nail 10.

In Figure 2 there is shown the upper part 27 of a femur having a neck 28 fractured as at 29. In this figure, there is shown a pilot pin 30 which has been drilled through the upper end of the femur so as to pass centrally through the neck 28. This pilot pin is positioned by aid of X-ray examination after which the nail 10 is engaged against the pin 30, the latter being small enough in diameter to pass through the mouth 12 and into the channel 11. With this construction it is thus unnecessary to thread the nail 10 onto the pin since it may be located by a simple lateral movement. The driver 21 is then slipped over the pin 30 and fitted on the outer end of the nail after which any suitable means may be used for impacting the outer end of the driver and thus forcing the nail into the bone. By reason of the fact that the bevels 16 and 17 are on the outer or remote faces of the ribs 13 the action of these bevels will be to force the nail firmly against the pilot pin as the nail is driven and consequently there will be no tendency for the nail to move away from the pilot pin and come out of the bone through the side of the neck. After the nail is driven to the required extent the pilot pin and driver are removed, and the nail is left in position until healing of the bone has been completed. In fact the nail may even be left permanently in place as a means for strengthening the bone at this point.

However, should it be desired to remove the nail after the bone has healed, there has been provided an extractor having a body 31 and from which projects an angle shank 32 adapted to fit in the opening 19 and enter the socket 20. The body 31 is preferably provided with a threaded recess at 33 so that it may be screwed on the threaded end 34 of an extractor handle 35. When it is desired to remove the nail the extractor is simply placed in position on the handle and engaged in the opening 19 where upon a pull exerted upon the handle will withdraw the nail.

There has thus been provided a simple and efficient device of the kind described and for the purpose specified.

What is claimed as new is:

1. A headless fracture nail comprising a stem forming a longitudinally extending and laterally opening channel, said channel having a bottom arcuate in cross-section with the arc substantially a half circle, a pair of ribs extending radially from the edges of the channel and a third rib extending radially from the back of the channel and spaced equally from said pair of ribs, said ribs having the front ends provided with cutting means, the front edge portion of said pair of ribs each having one face forming a plane surface and the other face bevelled to constitute a sharp edge lying in the plane of the first mentioned face, the bevelled faces being the faces adjacent the third rib whereby the nail will be urged against a predriven guide pin engaged in said channel.

2. A three-flanged fracture nail having a channel-shaped core, the flanges of which radiate from the channel shaped core, one flange extending radially from each edge of the channel and the third one from the back of the channel, the front end portions of the first two flanges having the faces adjacent the third flange bevelled off to incline away from the groove and form cutting edges while the other faces of said pair form plane surfaces, each cutting edge lying in the plane of the last mentioned face, the longitudinal edge portions of the said flanges being bevelled to form longitudinal cutting edges.

JOE J. ETTINGER.